US012154117B2

(12) United States Patent
Das et al.

(10) Patent No.: US 12,154,117 B2
(45) Date of Patent: Nov. 26, 2024

(54) FACILITATING AN AUTOMATED, INTERACTIVE, CONVERSATIONAL TROUBLESHOOTING DIALOG REGARDING A PRODUCT SUPPORT ISSUE VIA A CHATBOT AND ASSOCIATING PRODUCT SUPPORT CASES WITH A NEWLY IDENTIFIED ISSUE CATEGORY

(71) Applicant: Hewlett Packard Enterprise Development LP, Houston, TX (US)

(72) Inventors: Mainak Das, Bangalore (IN); Sean Charles Lennon, Derryloughaun East (IE); Salman Mumin Ahmed, Bangalore (IN); Richard Shelby Dunlap, Los Angeles, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 20 days.

(21) Appl. No.: 17/343,972

(22) Filed: Jun. 10, 2021

(65) Prior Publication Data
US 2022/0398598 A1 Dec. 15, 2022

(51) Int. Cl.
*G06Q 30/016* (2023.01)
*G06F 40/284* (2020.01)
(Continued)

(52) U.S. Cl.
CPC ......... *G06Q 30/016* (2013.01); *G06F 40/284* (2020.01); *G06F 40/35* (2020.01); *H04L 51/02* (2013.01)

(58) Field of Classification Search
CPC ........... G06Q 30/0282; G06Q 30/0203; G06N 20/00; G06K 9/6257
(Continued)

(56) References Cited

U.S. PATENT DOCUMENTS 9,317,574 B1 4/2016 Brisebois et al.
9,367,814 B1 6/2016 Lewis et al.
(Continued)

FOREIGN PATENT DOCUMENTS

WO 2020027843 A1 2/2020

OTHER PUBLICATIONS

Passemard, Antony, "Deliver an Exceptional Customer Experience with Contact Center AI, now GA", Google Cloud, available online at <https://cloud.google.com/blog/products/ai-machine-learning/contact-center-ai-now-ga>, Nov. 14, 2019, 4 pages.
(Continued)

*Primary Examiner* — Sangeeta Bahl
*Assistant Examiner* — Joshua D Schneider
(74) *Attorney, Agent, or Firm* — Dickinson Wright

(57) ABSTRACT

Embodiments described herein are generally directed to use of a chatbot to identify a customer-specified product support issue and provide appropriate troubleshooting guidance. According to an example, free text input describing an issue associated with a product line of a vendor is received from a user via a chatbot. A vector representation of the issue is created by tokenizing and vectorizing the free text input using a word association model corresponding to the product line. It is determined whether the issue matches at least one category within multiple issue categories for the product line by performing similarity scoring between the vector representation and multiple vectors created based on top words per issue category of the multiple issue categories. Responsive to an affirmative determination, an automated, interactive, conversational troubleshooting dialog is initiated with the user via the chatbot and guided based on a decision tree for the at least one category.

19 Claims, 10 Drawing Sheets

(51) Int. Cl.
*G06F 40/35* (2020.01)
*H04L 51/02* (2022.01)

(58) Field of Classification Search
USPC .................................................. 705/346, 304
See application file for complete search history.

(56) References Cited

U.S. PATENT DOCUMENTS

| | | | |
|---|---|---|---|
| 9,626,623 | B2 | 4/2017 | Lightner et al. |
| 9,661,067 | B2 | 5/2017 | Seth et al. |
| 9,715,496 | B1 | 7/2017 | Sapoznik et al. |
| 9,946,783 | B1* | 4/2018 | Lewis ..................... G06F 16/93 |
| 9,984,376 | B2 | 5/2018 | Rajaram et al. |
| 10,198,477 | B2 | 2/2019 | Malatesha et al. |
| 10,311,377 | B2 | 6/2019 | Vijayaraghavan et al. |
| 10,438,212 | B1 | 10/2019 | Jilani et al. |
| 10,475,045 | B2 | 11/2019 | Llagostera et al. |
| 10,580,012 | B2 | 3/2020 | Hausler et al. |
| 10,805,465 | B1 | 10/2020 | Krebs et al. |
| 10,891,322 | B2 | 1/2021 | Zhou et al. |
| 10,978,056 | B1 | 4/2021 | Challa et al. |
| 11,526,391 | B2 | 12/2022 | Dobos et al. |
| 11,594,213 | B2 | 2/2023 | Robert et al. |
| 11,972,424 | B1 | 4/2024 | Grudetskyi et al. |
| 2016/0099848 | A1* | 4/2016 | Krynski .............. H04L 12/6418 709/224 |
| 2018/0084139 | A1* | 3/2018 | Shimamura .......... H04N 1/3209 |
| 2018/0131645 | A1 | 5/2018 | Magliozzi et al. |
| 2018/0285768 | A1 | 10/2018 | Karuppasamy |
| 2019/0026815 | A1 | 1/2019 | Zhou et al. |
| 2019/0124020 | A1* | 4/2019 | Bobbarjung ............ H04L 51/02 |
| 2019/0171660 | A1* | 6/2019 | Kershaw ................ G06F 40/30 |
| 2019/0220695 | A1 | 7/2019 | Nefedov |
| 2019/0228105 | A1 | 7/2019 | Ma |
| 2020/0019561 | A1 | 1/2020 | Doyle |
| 2020/0059558 | A1* | 2/2020 | Mazza ................ H04M 3/5183 |
| 2020/0125992 | A1 | 4/2020 | Agarwal et al. |
| 2020/0134511 | A1 | 4/2020 | Ho et al. |
| 2020/0151648 | A1 | 5/2020 | Gorny |
| 2020/0159778 | A1 | 5/2020 | Mohanty et al. |
| 2020/0175091 | A1 | 6/2020 | Simon et al. |
| 2020/0211029 | A1 | 7/2020 | Shi et al. |
| 2020/0242623 | A1 | 7/2020 | Savir et al. |
| 2020/0258013 | A1 | 8/2020 | Monnett et al. |
| 2021/0004706 | A1 | 1/2021 | Riddle et al. |
| 2021/0014136 | A1 | 1/2021 | Rath |
| 2021/0232613 | A1* | 7/2021 | Raval Contractor .. G06N 3/044 |
| 2022/0012643 | A1 | 1/2022 | Tuo et al. |
| 2022/0108084 | A1* | 4/2022 | Kochura ................ G06F 40/30 |
| 2022/0291990 | A1 | 9/2022 | Iyer et al. |
| 2022/0309250 | A1* | 9/2022 | Das ........................ G06Q 30/01 |
| 2022/0343198 | A1* | 10/2022 | Chopra ................. G06F 18/214 |
| 2022/0394348 | A1 | 12/2022 | Hatambeiki et al. |
| 2023/0164095 | A1 | 5/2023 | Ramanathan et al. |
| 2023/0245651 | A1 | 8/2023 | Wang |
| 2024/0079000 | A1 | 3/2024 | Fernandez et al. |

OTHER PUBLICATIONS

Accenture, "Chatbots in Customer Service," 2016, pp. 1-13.
Google Cloud, "Dialogflow CX Basics," Feb. 25, 2021, pp. 1-10, Retrieved from the Internet on Mar. 8, 2021 at URL: cloud.google.com/dialogflow/cx/docs/basics.
Google Cloud, "Dialogflow ES Basics," Nov. 24, 2020, pp. 1-8, Retrieved from the Internet on Mar. 8, 2021 at URL: cloud.google.com/dialogflow/es/docs/basics.
Interactions LLC, "Interactions Intelligent Virtual Assistant," 2020, pp. 1-15, Retrieved from the Internet on Oct. 27, 2020 at URL: interactions.com/products/customer-engagement/.
Jui-Feng Yeh et al., "Topic Model Allocation of Conversational Dialogue Records by Latent Dirichlet Allocation," 2014, pp. 1-4, APSIPA.
Wikipedia, "Latent Dirichlet Allocation," Jan. 16, 2021, pp. 1-8, Retrieved from the Internet on Mar. 8, 2021 at URL: en.wikipedia.org/wiki/Latent_Dirichlet_allocation.
Wikipedia, "Long Short-Term Memory," Feb. 5, 2021, pp. 1-12, Retrieved from the Internet on Mar. 8, 2021 at URL: en.wikipedia.org/wiki/Long_short-term_memory.
Wikipedia, "Word2vec," Feb. 12, 2021, pp. 1-7, Retrieved from the Internet on Mar. 8, 2021 at URL: en.wikipedia.org/wiki/Word2vec.

* cited by examiner

FACILITATING AN AUTOMATED, INTERACTIVE, CONVERSATIONAL TROUBLESHOOTING DIALOG REGARDING A PRODUCT SUPPORT ISSUE VIA A CHATBOT AND ASSOCIATING PRODUCT SUPPORT CASES WITH A NEWLY IDENTIFIED ISSUE CATEGORY

BACKGROUND

A chatbot is a program with which one can communicate, typically via text or voice. Chatbots may use artificial intelligence (AI) and natural language processing (NLP) to understand what a human wants and provide interactive guidance. Recent developments in technology and machine learning have given chatbots more power in interpreting natural language, to both understand better, and learn over time.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
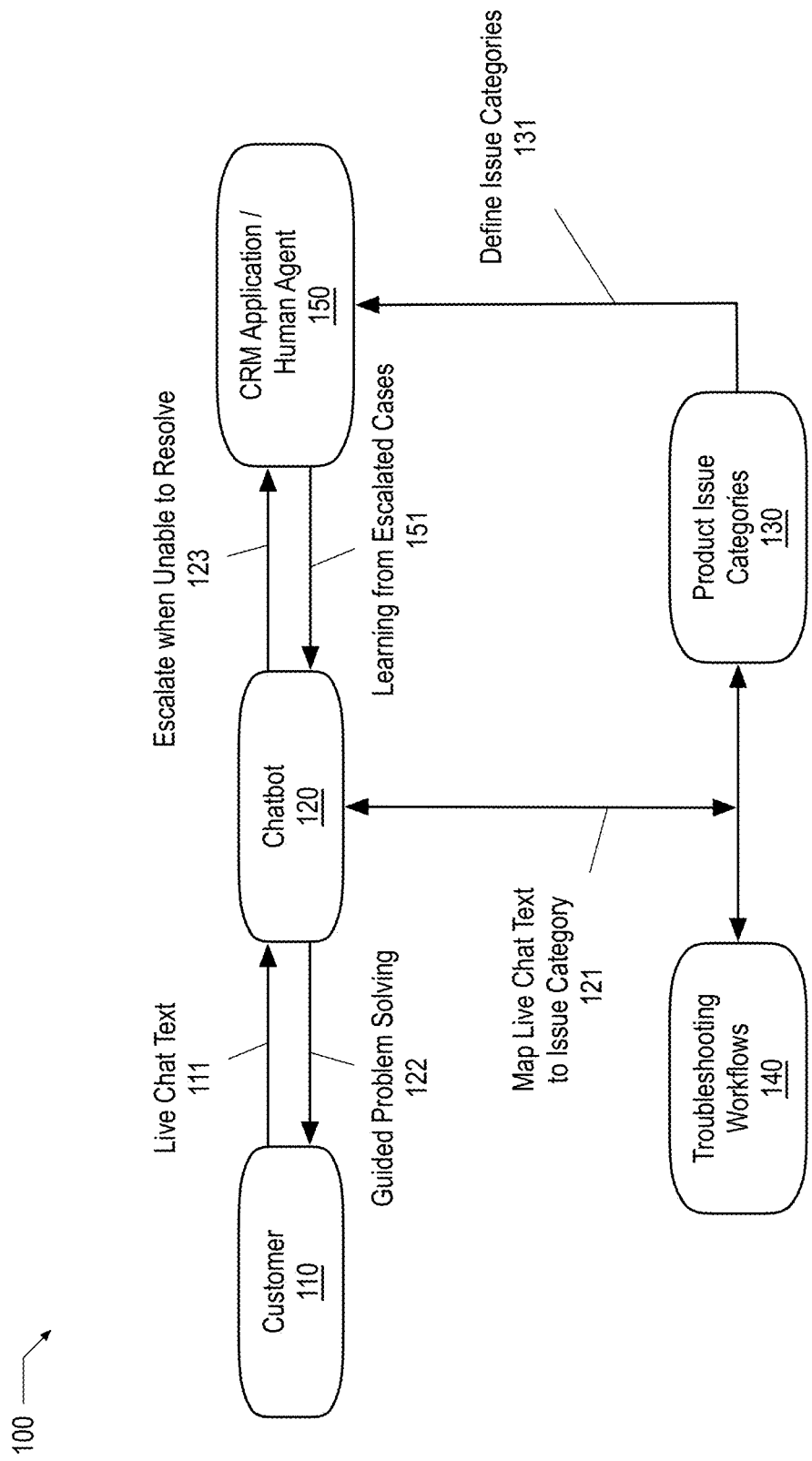
FIG. 1 shows a block diagram conceptually illustrating a high-level interactions within a chatbot environment in accordance with an example embodiment.

Embodiments described herein are generally directed to use of a chatbot to identify a customer-specified product support issue and provide appropriate troubleshooting guidance. Numerous specific details are set forth in order to provide a thorough understanding of exemplary embodiments. It will be apparent, however, to one skilled in the art that embodiments described herein may be practiced without some of these specific details.

A call center may represent a centralized department to which inquiries, for example, in the form of inbound phone calls, text messages, email messages and/or live chat sessions, from current and/or potential customers are directed. Call centers may be located within a company or may be outsourced to another company that specializes in handling such communications. In the context of a call center handling product/service support, agents of the call center may field requests from customers regarding the products/services of a particular vendor and text-based information regarding the interactions may be captured as historical case data. For example, responsive to receipt of a product support inquiry, a new product support case (or simply a case), representing a customer issue or problem, may be opened in a Customer Relationship Management (CRM) application to store, among other things, information regarding the product line and the specific component to which the issue or problem relates, a description of the issue, a resolution, whether the issue is remotely resolvable by the customer (e.g., no replacement parts are required and an onsite engineer is not required) and a level of criticality of the issue (e.g., critical vs. non-critical). When the product support inquiry involves a live chat session, the chat transcript may also be recorded.

Product vendors continue to invest large amounts of money, time, effort, and ongoing training on human agents for handling many entry-level to mid-range technical support issues (e.g., Tier 0 or L0, Tier 1 or L1, etc.). Assuming tens of thousands of product support cases are handled by or on behalf of a vendor annually, at a conservative deflection rate of 1% of such cases to automated means, such as a chatbot (and underlying AI models, infrastructure and resources), the vendor can reasonably expect to save millions of dollars a year. Various technological hurdles and complexities exist, however, to automating the handling of technical support issues including identification of product issue categories from historical case data, identifying an appropriate scope of product issue categories to be supported by the chatbot (e.g., those that are self-solvable by customers), training AI classification models (without undue upfront manual labeling of training data) to allow the chatbot to accurately identify customers' intent, and mapping of the identified intent to one of the supported product issue categories. Additionally, each product issue category might involve numerous complex resolution workflows (which may also be referred to herein as troubleshooting workflows and/or decision trees). Furthermore, ideally, the chatbot should gracefully handle scenarios in which the issue the customer is asking about is not currently solvable by the chatbot, the chatbot is unable to identify the intent from the customer text after multiple attempts, the customer indicates his/her issue remains unresolved after the chatbot has exhausted its troubleshooting flows, the customer has presented an issue the chatbot has not seen or learned before (and therefore the chatbot is unable to identify the issue correctly), the effectiveness or accuracy of the resolution of a particular issue/problem has diminished over time (e.g., as a result of changes in the product line), among others. Layered on top of the aforementioned complexities, is the further issue of how to properly incorporate the product-specific domain expertise of subject matter experts (SMEs) into the relevant processes and phases (e.g., identification of the types of product issues to be addressed, curation of training data, AI model training, and operationalization).

Embodiments described herein seek to address various of the issues described above. For example, during a first stage of deployment during which the amount of labeled product support cases is at or below a first threshold (e.g., 95%), a just-in-time labeling approach may be used to build up the corpus of labeled product support cases independently or in combination with a novel classification approach to map a real-time textual expression of customer intent to a product issue category. As described in further detail below, during this first stage of deployment, the novel issue classification approach may involve the use of a separate word association model (e.g., a Word2Vec model) for each product line to capture semantic similarity between words used to describe product issues and use of an intermediate classification model (e.g., a product-line specific Long Short-Term Memory Network (LSTM) model) to map a representation (e.g., a vector representation) of user free text to a matching representation (e.g., a vector representation) of a product issue category. As elaborated further below, the just-in-time labeling approach reduces the burden of upfront manual labeling of a large quantity of data by instead opting for a classification model having an accuracy that improves to a useable level over time (e.g., over a number of supervised training iterations).

According to one embodiment, in operation during the first stage of deployment, a chatbot associated with a product support system receives free text input from a user for a product support case describing an issue associated with a product line of a vendor. A vector representation of the issue is created by tokenizing and vectorizing at least a portion of the free text input using a word association model from a set of multiple word association models that corresponds to the product line. Each of the multiple word association models is based on a set of historical support cases relating to multiple supported issue categories for a respective product line of multiple product lines of the vendor that are remotely resolvable and meet a predefined threshold of criticality. A determination is made regarding whether the issue matches a category within the supported issue categories for the product line by applying an intermediate classification model to the vector representation. Responsive to an affirmative determination an automated, interactive, conversational troubleshooting dialog is initiated via the chatbot with the user in which the troubleshooting dialog is guided based on a decision tree for the particular issue category within the product line. Non-limiting examples of active learning and the real-time application of classification models during the first stage are described further below with reference to FIGS. 4 and 5.

After a first threshold (e.g., 95%) of product support cases has been labeled with SME-validated issue category labels and when an "other" category, representing a catch-all category with which those of the product support cases that do not fit within one of the defined issue categories are associated, is at or below a second threshold (e.g., 5%), then the product support system may transition to a second stage in which real-time processing no longer makes use of the intermediate classification model during processing of free text input received from users via the chatbot and unsupervised learning (e.g., an auto labeling approach) may be used to incrementally identify new issue categories. For example, as a result of a combination of the just-in-time labeling approach and call center agents tagging product support inquiries (e.g., inbound phone calls, text messages, email messages and/or live chat sessions) with SME-validated issue category labels during the first stage, the corpus of labeled product support cases will grow over time relative to the percentage of unlabeled product support cases. Similarly, as a result of ongoing retraining/refreshing of the classification models (e.g., the product line specific Word2Vec models and the product line specific LSTM models) and a topic model (e.g., Latent Dirichlet Allocation (LDA)) that may be used to identify issue categories, the "other" category will shrink over time. As such, as the product support system is used there will come a point in time at which the dependency upon SMEs in connection with labelling may be reduced, retraining of the models may be replaced with incremental addition of new issue categories, and a similarity test between customer issue text and relevant issue categories may be performed in place of the use of the intermediate classification model to perform such a mapping. As those skilled in the art will appreciate based on the description provided herein, in some implementations, during the second stage, no additional human dependency and no model retraining is required.

According to one embodiment, during the second stage, information indicative of a total number of product support cases associated with each of multiple issue categories for a product line of a vendor may be extracted from a set of historical support case records maintained by a call center. A determination may be made regarding whether the total number of product support cases associated with the "other" category exceeds a threshold (e.g., 30%); and if so: (i) a new issue category may be identified based on the product support cases associated with the other category; (ii) a new category vector for the new issue category may be added to a set of category vectors corresponding to the issue categories by vectorizing multiple top words of the new issue category based on a word association model corresponding to the product line; and (iii) association of subsequent product support cases with the new issue category by agents utilizing the call center may be facilitated by adding the new issue category to a list of issue categories available for use by the agents.

According to one embodiment, in the course of real-time interaction with a user via the chatbot while operating in accordance with the second stage, the chatbot may receive free text input from the user for a product support case describing an issue associated with a product line of a vendor. A vector representation of the issue may be created as in the first stage by tokenizing and vectorizing at least a portion of the free text input using a word association model corresponding to the product line. In contrast to the first stage and as described further below, however, rather than making use of the intermediate classification model, the second stage may determine whether the issue matches at least one category within multiple issue categories for the product line by performing similarity scoring (e.g., measuring cosine similarity) between the vector representation and issue category vectors created based on multiple top words per issue category of the multiple issue categories. Responsive to an affirmative determination, an automated, interactive, conversational troubleshooting dialog may be initiated via the chatbot with the user and guided based on a decision tree for the category. Non-limiting examples of automated labeling and the real-time use of similarity scoring during the second stage are described further below with reference to FIGS. 7 and 8.

Terminology

As used herein, a "chatbot" (a/k/a conversational agent) generally refers to a computer program or software application, executing on a hardware-based processing resource, that makes use of natural language processing (NLP) and is designed to mimic written or spoken human speech for the purposes of simulating a conversation or interaction with a real person. In various embodiments described herein, a chatbot may be used in the general context of customer service and more specifically in the context of Information Technology (IT) product support to conduct an online chat conversation via text or text-to-speech, in lieu of or prior to escalating a product support case to a live human agent (e.g., for unrecognized issues and/or unsupported product issue categories). In some examples, certain types of technical problems (e.g., those that are not remotely resolvable and/or those that are critical) may be excluded from the product issue categories supported by the chatbot.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not necessarily required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, a "call center" generally refers to the physical or virtual infrastructure that facilitates handling of customers' service related communications. A call center may be located within an organization, outsourced to another organization, or a combination thereof. Some call centers may have a centralized physical location at which a high volume of customer and other telephone calls are handled by an organization, usually with some amount of computer automation. Other call centers may be more virtual in form to facilitate support for agents in various distributed geographic locations. While the traditional call center model focused on inbound and/or outbound phone calls, as used herein "call center" is intended to encompass additional channels and forms of communication including, but not limited to, live chat.

As used herein, the phrase "case record" is intended to broadly refer to a unit of case data maintained or otherwise utilized by a call center. Case records may include, among other fields, a title, a description, a subject, a unique identifier (e.g., a case number), information identifying the product/service at issue, information identifying the model, serial number and/or version of the product/service at issue, and various other free-form text fields (e.g., a case notes field).

Reference in the specification to "one embodiment" or "an embodiment" means that a particular feature, structure, or characteristic described in connection with the embodiment can be included in at least one embodiment of the invention. The appearances of the phrase "in one embodiment" are not necessarily all referring to the same embodiment.

The terms "component", "module", "system," and the like as used herein are intended to refer to a computer-related entity. Such a component, module, or system may be in the form of a software-executing general-purpose processor, hardware, firmware or a combination thereof. For example, a component may be, but is not limited to being, a process running on a processor, an object, an executable, a thread of execution, a program, and/or a computer. By way of illustration, both an application running on a server and the server can be a component. One or more components may reside within a process and/or thread of execution, and a component may be localized on one computer and/or distributed between two or more computers. Also, these components can execute from various non-transitory, computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

FIG. 1 shows a block diagram conceptually illustrating high-level interactions within a chatbot environment 100 in accordance with an example embodiment. In the context of various embodiments described herein, a chatbot (e.g., chatbot 120) receives live chat text 111 from a customer (e.g., customer 110). The live chat text 111 may include a description, in the customer's words, of a problem or issue being experienced by the customer with a product line of a vendor. The chatbot, in turn, may initiate guided problem solving 122 based on a troubleshooting workflow within a set of defined troubleshooting workflows 140.

The troubleshooting workflows 140 may correspond to product issue categories 130, representing the universe of those product issue categories in the scope of the chatbot. The appropriate troubleshooting workflow may be identified by the chatbot 120 mapping the live chat text 121 to a particular product issue category within the supported product issue categories 130. As described further below with reference to FIG. 2, in one embodiment, the product issue categories 130 may be determined based on curated and/or preprocessed historical case data including historical information captured by live human agents over time that provide customers with guidance regarding technical support issues.

According to one embodiment, the troubleshooting workflows 140 are guided troubleshooting decision trees designed with the assistance of product support subject matter experts (SMEs) and with reference to product manuals, and/or support knowledge articles. A non-limiting example of intent discovery and acquisition that may be performed by a combination of human SMEs and machine learning approaches to produce the troubleshooting workflows 140 is described further below with reference to FIG. 2.

The product issue categories 130 may also be used to define issue categories within a CRM application 150 to allow human agents to label support cases as being associated with one of the product issue categories 130. As noted above, an "other" category may be included within the product issue categories 130 to serve as a catch-all category for those of the product support cases that do not fit within one of the other defined issue categories.

In one embodiment, when the chatbot is unable to resolve the customer's issue, the product support case may be escalated 123 to a live human agent. The chatbot (or more precisely, the underlying classification models on which it relies) may additionally learn 151 from the escalated cases.

Various other non-limiting examples of integrations that may be useful during operation of the chatbot are described further below with reference to FIG. 2.

Figure 2:
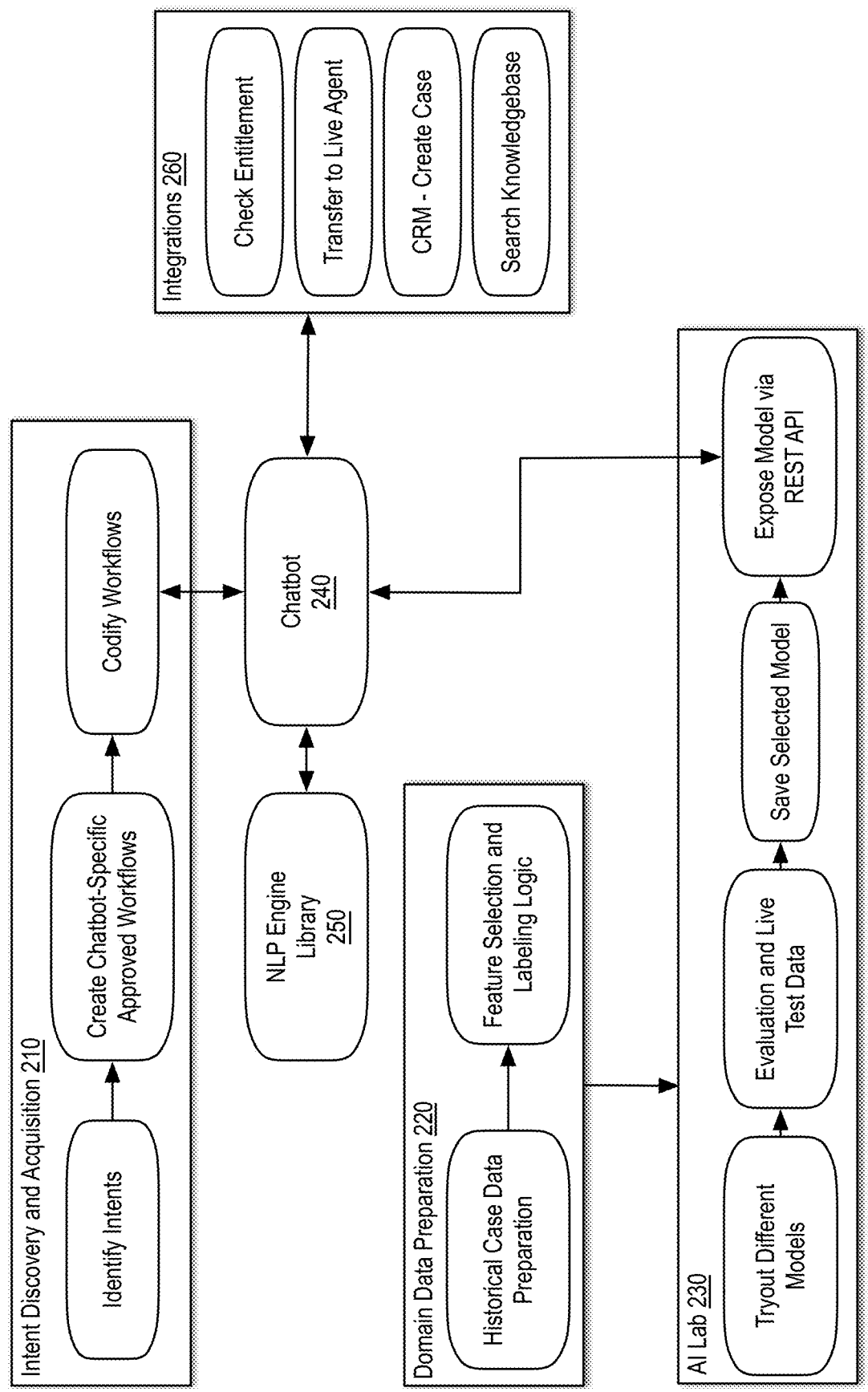
FIG. 2 shows a block diagram illustrating workflow and integrations in accordance with an example embodiment.

FIG. 2 shows a block diagram illustrating workflow and integrations in accordance with an example embodiment. Various non-limiting examples of workflows that may be performed in support of a chatbot environment include intent discovery and acquisition 210, domain data preparation 220, and testing, evaluation, and other activities that may be performed in an AI lab 230.

In the context of the present example, intent discovery and acquisition 210 may include activities performed by a combination of human SMEs and machine-learning processes. In one embodiment, intent identification processing may be performed to address issues associated with interpreting free text problem descriptions from customers. As a vendor (e.g., an IT product vendor) may have a number of product lines and a variety of types of product support issues may currently be handled by live human agents, it may first be desirable to define the scope of the product issue categories to be diverted to a chatbot (e.g., chatbot 240). Entry-level to mid-range product support issues/cases currently being handled by human agents typically fall into scenarios involving agnostic intents (e.g., warranty coverage inquiries and product support case status inquiries), direct part replacement (e.g., the customer has confirmed a part has failed and needs a replacement part), and customer self-solvable intents (e.g., those issues that are non-critical and customer remotely resolvable). In one embodiment, the scope of product issue categories to be addressed by the chatbot are limited to those falling within the latter. That is, the product issue or problem should be of a non-critical nature and it should be feasible for the customer to remotely resolve the issue without requiring an onsite engineer or replacement parts.

In one embodiment, intent identification may first involve filtering the historical case data to create a subset of the product support cases that are both remotely resolvable and non-critical. A neural network classification model may be trained with pre-labeled data for fields indicative of criticality and remote resolvability. Then, a series of AI classification tasks may be performed to determine criticality and remote resolvability for the entirety of the historical case data, thereby allowing the desired subset of historical product support cases to be identified. The resulting subset of product support cases may be subjected to further processing in an iterative manner in which an SME examines the domain specific raw text of case notes made by human agents to build a taxonomy or curated list of class issues (product issue categories) that may be further processed by machine-learning clustering algorithms. For example, based on the historical case data, an SME may identify top issues (or topics) on a per product line basis that occur within the historical case data. One or more statistical modeling approaches (e.g., topic modeling) may be used to discover the abstract "topics" that occur in the historical case data. A non-limiting example of a topic modeling approach that may be used is Latent Dirichlet Allocation (LDA). As described further below, in some embodiments, LDA may be applied at both the product component level and the product category issue level. Ultimately final issue categorization for labeling purposes may be achieved by using a hybrid approach of direct human feedback and machine learned models. For example, an SME may compose a label for a product issue category based on a review of the top words of a topic output by the topic model or the SME may approve the use of all or some subset of the top words to be used as the label for the product issue category.

Based on the limited set of product issue categories to be supported by the chatbot for each product line at issue, chatbot-specific approved workflows may be created for each issue category within the given product line with input from appropriate members of the product engineering teams. Once reviewed and approved by appropriate stakeholders, the troubleshooting workflows may be codified and made accessible for use by the chatbot at run-time, for example, via an Application Programming Interface (API) (e.g., a Representational State Transfer (REST) API). In one embodiment, the troubleshooting workflows may be incorporated within a third-party platform (e.g., Google Dialogflow) that understands natural language.

The domain data preparation 220 and AI lab 230 stages may relate to decision making in connection with whether to escalate a product support case from the chatbot to a live human agent as well as associated learning from escalated cases. According to one embodiment, historical case data preparation and feature selection and labeling logic may be performed as part of the domain data preparation 220 stage, including preprocessing of case data, including concatenating together the "issue subject" and the "issue description" fields, cleaning (e.g., removal of punctuation, numbers, and stop words), tokenization (e.g., using unigram, bigram, and trigrams). The case history text can then be filtered by product line to create a custom corpus that may be fed as input to a word association model (e.g., Word2Vec), thereby producing a product line specific word association model for each product line. For example, customer-provided product identification information (e.g., serial numbers) annotated within the case records may be used to facilitate automated filtering to create custom corpora for multiple product lines. In one embodiment, As described further below with reference to FIG. 5, during real-time processing of customer live chat text, tokenized text may be converted to numerical vectors with these learned word association models.

In the AI lab 230 stage, various word association models may be evaluated with live test data, and an accuracy level determined for each iteration. In one embodiment, after desired levels of accuracy are achieved, a selected model may be saved and exposed via a REST API for use by the chatbot during run-time. A non-limiting example, of an active learning process that may be performed in the AI lab 230 stage is described below with reference to FIG. 4.

Each live chat may involve a general flow, including a greeting, entitlement checking, issue discussion, and a resolution phase. At run-time, the chatbot, for example, during operationalization of the word association and classification models (e.g., product-line specific Long Short-Term Memory Network (LSTM) models), may also make use of an NLP engine library 250 and various integrations 260. In one embodiment, the NLP engine library 250 may be used at each step of the conversational dialog with the customer to support speech recognition (e.g., parsing and splitting the text using parts of speech classifiers, identification of entities and intents, etc.). In the context of the present example, appropriate interfaces may be made available for use by the chatbot to check a customer's entitlement to support for the product at issue, transfer the case to a live agent, create a case within a CRM application, and/or assist the customer self-solve the product issue by returning knowledge articles resulting from searching a product support knowledge article database based on the customer defined issue text and information identifying the product line at issue (e.g., a product name and/or serial number).

Figure 3:
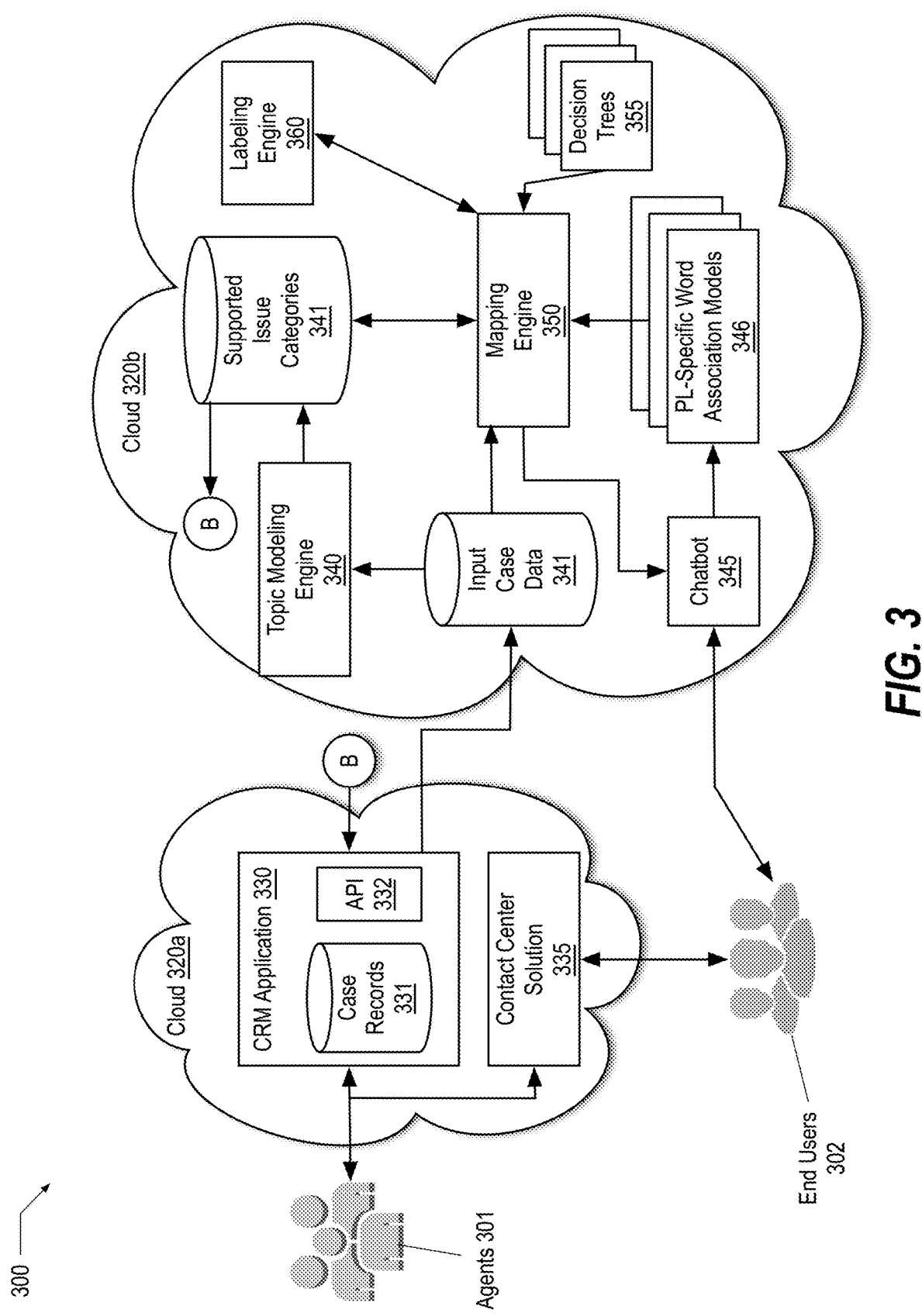
FIG. 3 shows a block diagram illustrating an architecture in accordance with an example embodiment.

FIG. 3 shows a block diagram illustrating an architecture 300 in accordance with an example embodiment. While various examples provided herein are described in the context of assisting customers (e.g., end users 302) in connection with troubleshooting product/service issues through live chat via a chatbot and/or live human agents (e.g., agents 301) associated with a product support system, the methods and systems described herein are generally applicable to other processes involving live chat.

In the context of the present example, the architecture 300 includes one or more clouds 120a-b, which may represent private or public clouds. Cloud 320a may be a public cloud through which a Customer Relationship Management (CRM) application 330 (e.g., Salesforce, Microsoft Dynamics 365, and Zoho CRM) and an associated contact center solution 335 are delivered as a service to the agents to, for example, facilitate handling and documentation of inbound communications from the customers of a vendor of a particular product or service. According to one embodiment, CRM application 330 includes a case records database 331 and an Application Programming Interface (API) 332. The case records database 331 may store historical case data, including case notes input in the form of text-based information by call center agents, relating to support issues raised by customers. Additionally, the case records database 331 may store chat transcripts of live chat sessions. For example, customers may communicate with the call center agents through chat and/or other communication mechanisms (e.g., voice calls or video calls) supported by the contact center solution 335. Depending upon the particular implementation, API 332 may be a REST API through which interactions between the CRM application 330 and other external systems, including those associated with the chat environment, may be handled.

Cloud 320b may be a private cloud of the vendor in which functionality may be implemented to, among other things, processing and analyze case data extracted from the CRM application 330. In the context of the present example, cloud 320b includes a chatbot 345 (which may correspond to chatbots 120 and 240), a topic modeling engine 340, a labeling engine 360, a mapping engine 350, decision trees 355, and multiple product line specific word association models 346, which may be trained for each product line based on case history text filtered by product line. For example, the multiple product line specific word association models 346 may be generated based on the results of the historical case data preparation in the domain data preparation 220 stage, the decision trees 355 may generally correspond to the workflows codified during the intent discovery and acquisition 210 stage, and the classification models employed by the mapping engine 350 may be those tested and evaluated in the AI Lab 230 and ultimately exposed via a REST API.

In one embodiment, the topic modeling engine 340 is responsible for finding clusters of cases as well as suggested top words that may be used to identify those case clusters to facilitate product issue categorization. For example, the topic modeling engine 340 may load a subset of case records from the case records database 331 via API 332 into an input case data database 341 to facilitate performance of LDA at one or more levels of granularity. In one embodiment, LDA is performed on the extracted case data at the component level (e.g., a power supply, battery, or a fan of a server), the product line level (e.g., HPE ProLiant ML servers produced by Hewlett Packard Enterprise Company), and/or the issue level (e.g., hard drive failure, how to update the power supply firmware). As noted above, issue texts extracted from the case records may first be cleaned and words may be extracted as either a single word (unigram), two consecutive words (bigram), and/or three consecutive words (trigram). The number of topics/categories (e.g., the top words identified by LDA for each of the issue categories) may be varied over several runs and a perplexity score may be calculated for each combination. The identified combination of words (or a revised category label provided by an SME) may then be used for the issue category, persisted in the a supported issue categories database 341 and represented by a single vector upon completion by applying the corresponding product line specific word association model from the product line specific word association models 346. In one embodiment, the supported issue categories may be pushed to the CRM application 330 via API 332 to allow the agents 301 to appropriately label the product support cases they continue to handle with consistent product issue categories.

In another embodiment, a twofold check of topic modeling (e.g., LDA) results is performed on the number of clusters and top words per cluster. For example, the system may be designed to constrain the cluster counts for both product category issues and issue resolutions categories are equivalent and then to iteratively check for a near one-to-one mapping between issue and resolution clusters. As described further below, a perplexity score may be used as a means of determining an appropriate number of clusters.

In the context of the present example, mapping engine 350 may be responsible for mapping customer descriptions of problems to a product issue category in the scope of the chatbot 345. As described further below, during the first stage of operation (e.g., while the amount of labeled product support cases has yet to achieve a first threshold and the percentage of product support cases associated with "other" category remains above a second threshold), an intermediate classification model (e.g., in the form of a product line specific LSTM model) may be used to match the vectorized output of a product line specific word association model that represents the customer description of a product issue he/she is experiencing to a corresponding vectorized output of the product line specific word association model representing a product issue category supported by the chatbot 345. After transitioning to the second stage of operation (e.g., responsive to the amount of labeled product support cases achieving the first threshold and the percentage of product support cases associated with "other" category meeting or falling below the second threshold), real-time processing of may no longer make use of the intermediate classification model during processing of free text input received from users via the chatbot 345. For example, as described further below, the real-time processing of customer descriptions of problems received by the chatbot 345 may instead determine whether the customer-supplied issue description matches at least one category within multiple issue categories for the product line at issue by performing similarity scoring (e.g., measuring cosine similarity) between the vector representation and issue category vectors associated with the product line.

Then, as described further below, based on the identified product issue category (or one selected by the customer from among multiple potential matches), an automated, interactive, conversational troubleshooting dialog may be initiated with the customer via the chatbot 345 as guided based on a corresponding decision tree of the decision trees 355. In this context, automation refers to the use of guided decision tree troubleshooting flows, interactive refers to the question and answer conversation between the customer and the chatbot, and conversational refers to the ability to process free text (e.g., natural language text) input by a customer during a chat session as a means of communication as opposed to, for example, interactions with a traditional user interface including buttons or menu selections.

During the second stage of operation, the mapping engine 350 may maintain a list of issue category vectors per product line. In one embodiment, the appropriate product-line specific word association model may be used to create one issue category vector per issue category per product line. As described further below, the appropriate product-line specific list of issue category vectors may be used during real-time similarity scoring to map customer issue descriptions with one or more matching product issue categories. In various examples, the vector representation of the customer issue description may be considered to match an issue category vector of a given product issue category when a similarity metric (e.g., a cosine similarity score) between the two vectors is greater than or equal to a threshold.

In one embodiment, labeling engine 360 is operable to associate labels with product issue categories (and/or corresponding vectorized representations of same output by a product line specific word association model). For example, during the first stage, a supervised learning process may be used to associate labels of product issue categories with a training dataset during training of the mapping engine 350. A non-limiting example of a supervised learning process for training the mapping engine 350 is described below with reference to FIG. 4. The product line specific word association models may be trained concurrently with the supervised learning process. After a sufficient amount of product support cases have been labeled with SME validated product issue categories as a result of first stage operations, during the second stage, the labeling engine 360 may operate more independently of and reduce the burden on SMEs by performing unsupervised learning (e.g., an auto labeling approach) to incrementally identify and label new issue categories. A non-limiting example of an automated labeling approach that may be used during the second stage of operations is described below with reference to FIG. 7.

The various engines (e.g., topic modeling engine 340, mapping engine 350, and labeling engine 360 and other functional units (e.g., chatbot 345) described herein and the processing described below with reference to the flow diagrams of FIGS. 4-8 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms, such as the computer systems described with reference to FIGS. 9-10 below.

Figure 4:
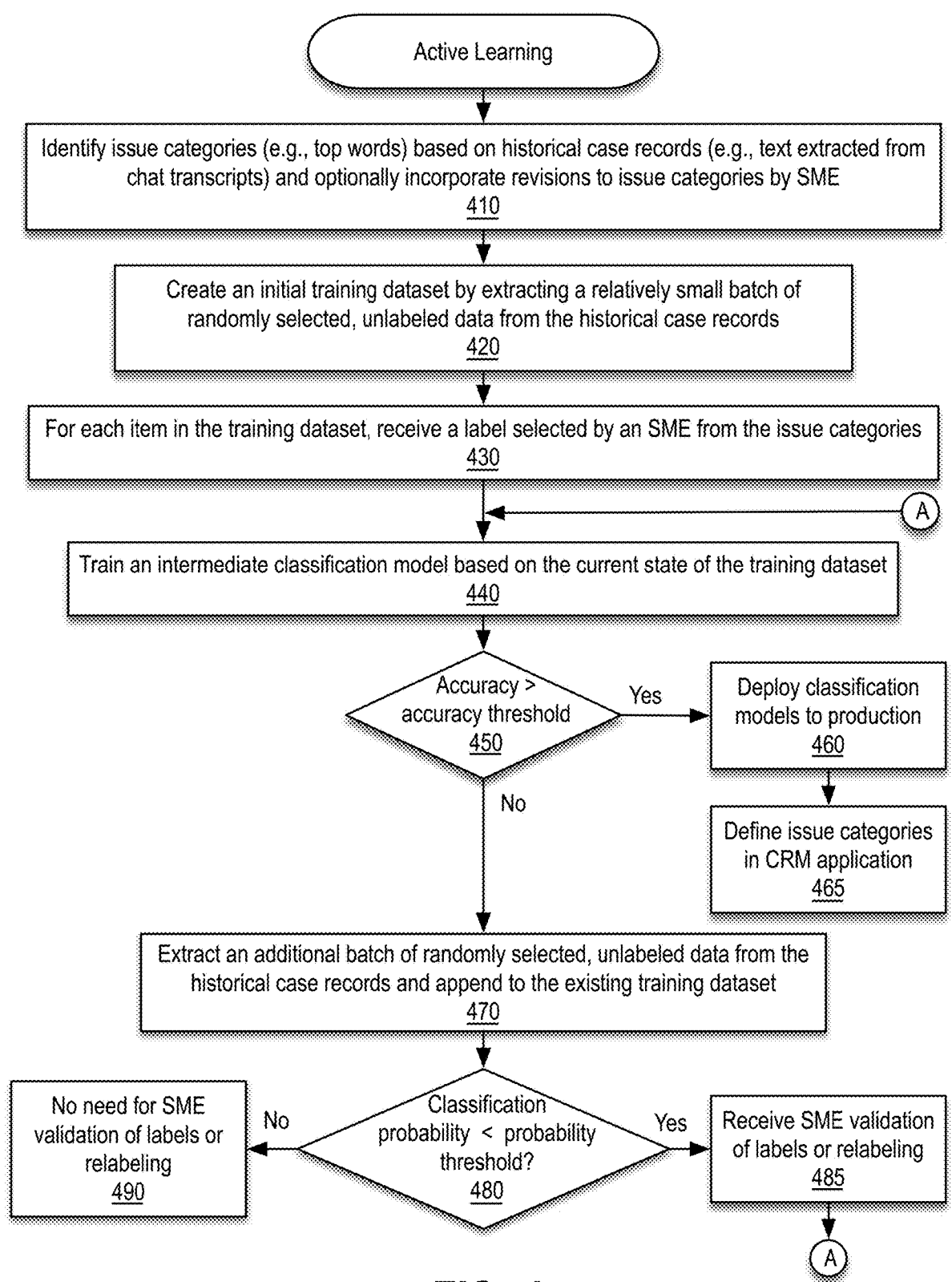
FIG. 4 shows a flow diagram illustrating supervised learning processing in accordance with an example embodiment.

FIG. 4 shows a flow diagram illustrating supervised learning processing in accordance with an example embodiment. As indicated above, in various examples, an active learning process may be performed during a first stage of operations in which the amount of product support cases labeled with SME-validated labels is at or below a first threshold (e.g., 95%) and the amount of product support cases associated with the "other" category is at or above a second threshold (e.g., 5%). After the first threshold of product support cases has been labeled with SME-validated issue category labels and when the "other" category is at or below the second threshold, then the product support system may transition to a second stage of operations in which unsupervised learning (e.g., the auto labeling approach described with reference to FIG. 7) may be used to incrementally identify new product issue categories.

In the context of the present example, the active learning process is employed to iteratively train an intermediate classification model (e.g., representing the mapping engine 350) to map customer descriptions of product issues to supported product issue categories (e.g., supported issue categories 341) for a particular product line. More specifically, the intermediate classification model matches outputs (e.g., numerical vectors) of a product line specific word association models (e.g., one of the product line specific word association models 346) to representations (e.g., numerical vectors) of the supported product issue categories. The supervised learning process may be repeated for each product line to train product line specific LSTM models for each product line.

At block 410, product issue categories (e.g., top words) may be identified based on historical case records (e.g., case records 331). According to one embodiment, a corpus of data may be created by extracting text from chat transcripts of live chats stored within the historical case records and a topic model (e.g., LDA) may be applied to find clusters of cases (representing the product issue categories) as well as the suggested top words for naming (labeling) the clusters.

As noted above, the topic model may be performed at both a component level and a product level. Empirical data suggests improved accuracy of the mapping from customer issue descriptions to product issue categories can be achieved for at least certain product lines when the historical case records are first segregated by components, for example, as suggested by SMEs and then performing topic modeling at the component level. Clustering at only one level, for a particular product line (e.g., a storage platform), different hard disk related issues may tend to be included under all one hard disk drive (HDD) failure category; however, when clustering is first performed to cluster issues into components, such as HDD, and then another level of clustering is performed for the particular product line, improved product issue categories may be achieved. In one embodiment, the identified product issue categories are displayed to an SME to facilitate subsequent manual labeling. Additionally, revisions to the labels associated with product issue categories may optionally be incorporated based on input from an SME.

At block 420, an initial training dataset may be created by extracting a relatively small batch of randomly selected, unlabeled data from the historical case records. The relatively small batch of case records are selected from those historical case records relating to the product line at issue and may represent approximately between 1% to 4% of the total number of case records across all product lines.

At block 430, manual labeling is performed by the SME for each item in the training dataset. For each item in the training dataset, information may be received from the SME regarding a selected label from the supported issue categories to be associated with the item. In this manner, a first batch of 2,000 manually labeled items may be created, for example.

At block 440, the intermediate classification model is trained based on the current state of the training data set. For example, given a limited first set of data, artificial neural network training techniques may be used to map issue text contained in the historical case records to different issue categories, and thus enable a classification model that can be used for run-time understanding of customer free text input describing an issue associated a product line of a vendor. Non-limiting examples of artificial neural network training techniques that may be used include multilayer perception (MLP), LSTM, recurrent neural networks (RNNs) as well as other classical approaches (e.g., support vector machines (SVMs) or random forest). In various examples described herein, block 440 is considered an intermediate step as the trained model may be further retrained iteratively as discussed further below so as to achieve statistically acceptable and accurate results.

At decision block 450, it is determined whether the accuracy of the intermediate classification model exceeds a predetermined or configurable accuracy threshold. If so, processing branches to block 460; otherwise, processing continues with block 470. In one embodiment, accuracy is measured by setting aside 30% of the original dataset for testing and validation. For example, the learned model may be run against the unseen 30% dataset and the predictions may be checked with already existing SME validated labels. Accuracy may be measured based on the number of correct predictions divided by the total number of predictions. In one embodiment, the accuracy threshold is 90% and multiple training iterations are expected to be performed before such accuracy is achieved.

When starting with an unknown dataset, there will not be any pre-labeled data to facilitate computation of accuracy. As such, coherence (how best the top words explain the topics) and perplexity (how surprised the model is in seeing new data) may be used to evaluate whether the number of topics and topic modeling in general is working as desired. Higher coherence generally correlates with better modeling, whereas lower perplexity generally correlates with a better model fit. For topic modelling (e.g., LDA), coherence and perplexity are standard measures used to evaluate the effectiveness of the model. For LSTM, the accuracy metric for unseen data (e.g., based on precision, recall, or an F1 score) may be used for evaluate the effectiveness of the model.

Based on empirical data involving a variable number of topics or issue categories, as the cluster numbers increases, the perplexity and coherence scores show improvement since there are less diverse records within the same issue category; however, classification of new unseen data sets into the clusters becomes less accurate since the categories are not generalized enough and tend to be aligned more to individual records. As such, various embodiments described herein address this trade-off by comparing the accuracy of the classification model with perplexity and coherence scores to find the right balance in terms of the number of clusters, for example, at a point at which a linearized perplexity score intersects with a linearized accuracy score. Over time, as pre-labeled data is available, the accuracy of the intermediate classification model may be computed based on the ratio of the number of correctly predicted product issue category labels for the customer descriptions to the total number of predictions or based on other metrics (e.g., precision, recall or the F1 score).

If the intermediate classification model has been trained sufficiently to achieve the desired accuracy threshold ("Yes" at block 450), the process proceeds to block 460, where the classification models (e.g., the intermediate classification model and the product line specific word association models) may be deployed to the production environment for use by a chatbot (e.g., chatbot 345) during live chat sessions with customers.

At block 465, the supported issue categories may be defined within the CRM application. In this manner, live human agents (e.g., agents 301) may associate appropriate product issue category labels with product support cases they continue to handle on an ongoing basis. In one embodiment, an "other" category may be included to capture those product support cases that do not fit within the existing set of product issue categories. As explained further below, with reference to FIG. 6 this other category may be used as a triggering condition for performing retraining/refreshing of the classification models.

If the intermediate classification model is determined to be not yet sufficient to achieve the desired accuracy threshold ("No" at block 450), the process proceeds to block 470. At block 470, an additional batch of randomly selected, unlabeled data from the historical case records is extracted and appended to the existing training dataset, thereby creating a training dataset including some manually labeled and some unlabeled data. In an example, the number of case records in the additional batch may be the same as the initial batch selected in block 420. At this point, the current state of the training dataset (as updated with additional records by block 470) may be fed to the intermediate classification model.

At block 480, borderline items within the training dataset may be identified. For example, it is determined whether the class probability associated with the individual items in the training dataset is less than a desired probability threshold. That is, it is determined whether the intermediate classification model's confidence in its predicted labels is less than the desired probability threshold. Individual training data for which the intermediate classification model's confidence is less than the desired probability threshold are deemed borderline items and then processing continues with block 485. If no confidence values are less than the desired probability threshold, processing branches to block 490. In one embodiment, the desired probability threshold is 0.7.

At block 485, validation of the predicted labels of borderline items or relabeling of the borderline items identified at decision block 480 may be performed by the SME. For example, for each of the borderline items, the SME may confirm as correct the prediction made by the intermediate classification model or the SME may select a different label associated with one of the supported issue categories for the item. At this point, processing may loop back to block 440 to perform another training iteration.

At block 490, there is no need for SME validation of labels or relabeling as the class probability of all items in the training dataset meets or exceeds the desired probability threshold To illustrate, the intermediate classification model may start with a small amount of manually labelled data (e.g., 2,000). Subsequently, an additional batch (e.g., 2,000) new records may be sent to the classifier and depending on the accuracy, some proportion will be inaccurately classified. These incorrectly classified cases may be sent for correction to the SME using the probability assigned for the class prediction and combined with the training data that was correctly classified, Then, a subsequent iteration may be run using the combined (e.g., 4,000) data. Over time, the accuracy of the model improves to a useable level and upfront manual labelling a large quantity of data can be avoided to achieve "just in time" labeling.

While in the context of the present example and in the context of subsequent flow diagrams, a number of enumerated blocks are included, it is to be understood that embodiments may include additional blocks before, after, and/or in between the enumerated blocks. Similarly, in some embodiments, one or more of the enumerated blocks may be omitted or performed in a different order.

Figure 5:
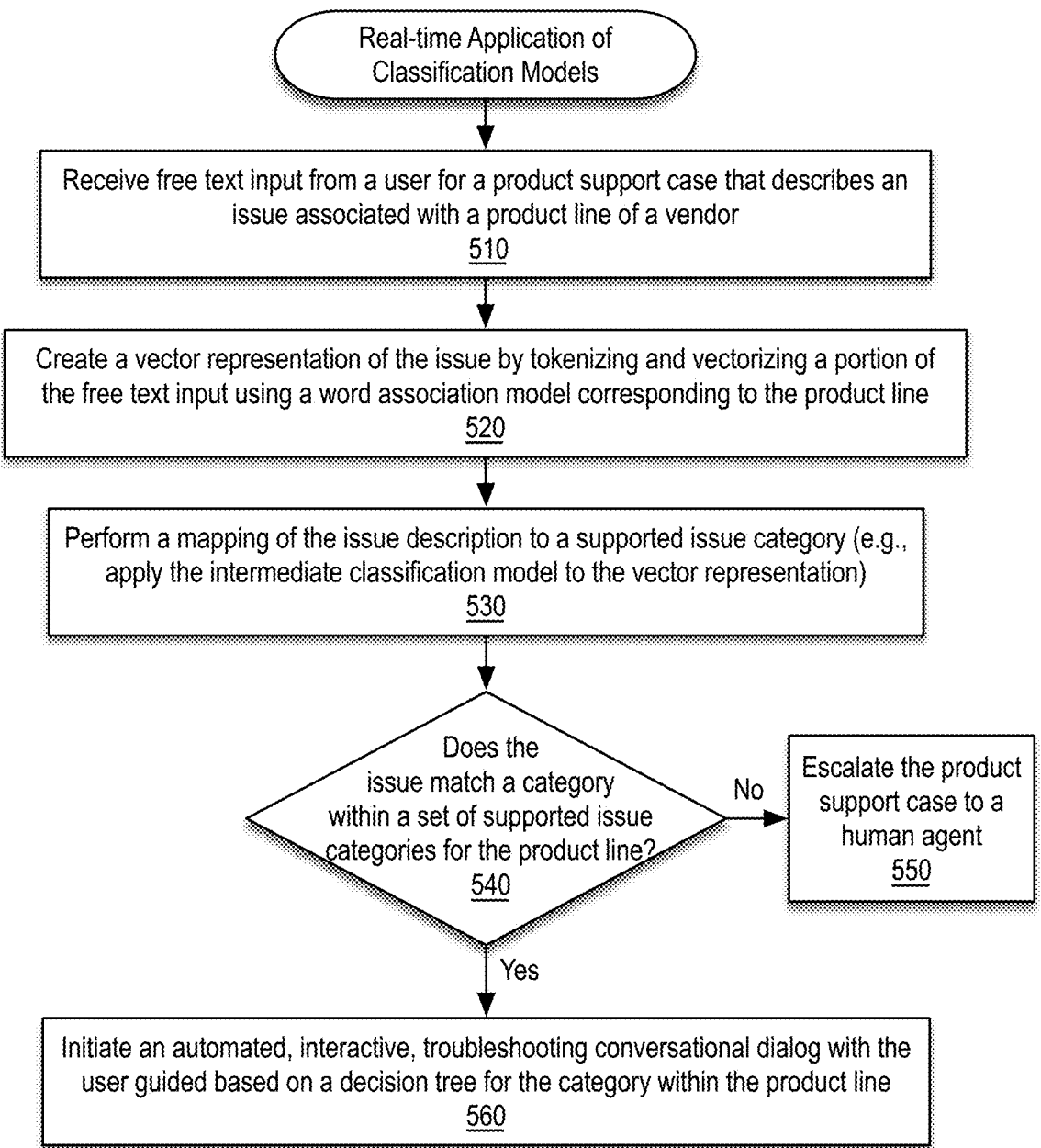
FIG. 5 shows a flow diagram illustrating real-time application of classification models in accordance with an example embodiment.

FIG. 5 shows a flow diagram illustrating real-time application of classification models in accordance with an example embodiment. As indicated above, in various examples, during a first stage of operations in which the amount of product support cases labeled with SME-validated labels is at or below a first threshold (e.g., 95%) and the amount of product support cases associated with the "other" category is at or above a second threshold (e.g., 5%), product-line specific word association models and an intermediate classification model (e.g., a product-line specific LSTM model) may be used to map a representation (e.g., a vector representation) of user free text to a matching representation (e.g., a vector representation) of a product issue category. After the first threshold of product support cases has been labeled with SME-validated issue category labels and when the "other" category is at or below the second threshold, then the product support system may transition to a second stage of operations during which a similarity test between customer issue text and relevant issue categories may be performed (e.g., as described with reference to FIG. 8) in place of the use of the intermediate classification model.

At block 510, free text input, describing an issue associated with a product line of a vendor, is received from a customer (e.g., one of end users 302) for a product support case. In one embodiment, the free text input is received by a chatbot (e.g., chatbot 345) after the chatbot has received information (e.g., a product name and/or serial number) from the customer identifying the product or product line at issue.

At block 520, a vector representation of the customer described issue or problem is created by tokenizing and vectorizing all or some portion of the free text input. In one embodiment, the free text input containing the issue description is input to a product line specific word association model (e.g., a Word2Vec model).

At block 530, the customer issue description (e.g., a numerical vector output by the product line specific word association model) is mapped by a mapping engine (e.g., mapping engine 350) to a supported issue category. For example, an intermediate classification model (e.g., a product specific LSTM model trained in accordance with the supervised learning approach described with reference to FIG. 4) may attempt to match the representation of the customer issue description to a representation of a supported issue category.

At decision block 540, it is determined whether the customer issue description matches a category within the set of supported issue categories (e.g., supported issue categories 341) for the product line at issue. If so, then processing continues with block 560; otherwise, processing branches to block 550.

At block 560, the chatbot may initiate an automated, interactive, troubleshooting conversational dialog with the user guided based on a decision tree (e.g., one of decision trees 355) for the matching product issue category within the product line as identified at decision block 540.

At block 550, no match was found for the customer issue description and the product support case may be escalated to a live human agent. This may be a result of the customer having described a previously unseen (or unlearned) product issue or the customer issue description not being within the scope of those issues resolvable by the chatbot. Other potential reasons for escalating a product support case may include a finding that the customer is not entitled to support for the product at issue, the chatbot is unable to identify the intent from the customer text after multiple attempts, and/or the customer provides feedback that his/her issue remains unresolved after the chatbot has executed the troubleshooting flows. In one embodiment, before escalating the product support case to the live human agent, the chatbot may further attempt to help the customer to self-solve the issue by performing a search through a support knowledge article database based on the customer defined issue text and may return relevant links to relevant knowledge documents to the customer.

Figure 6:
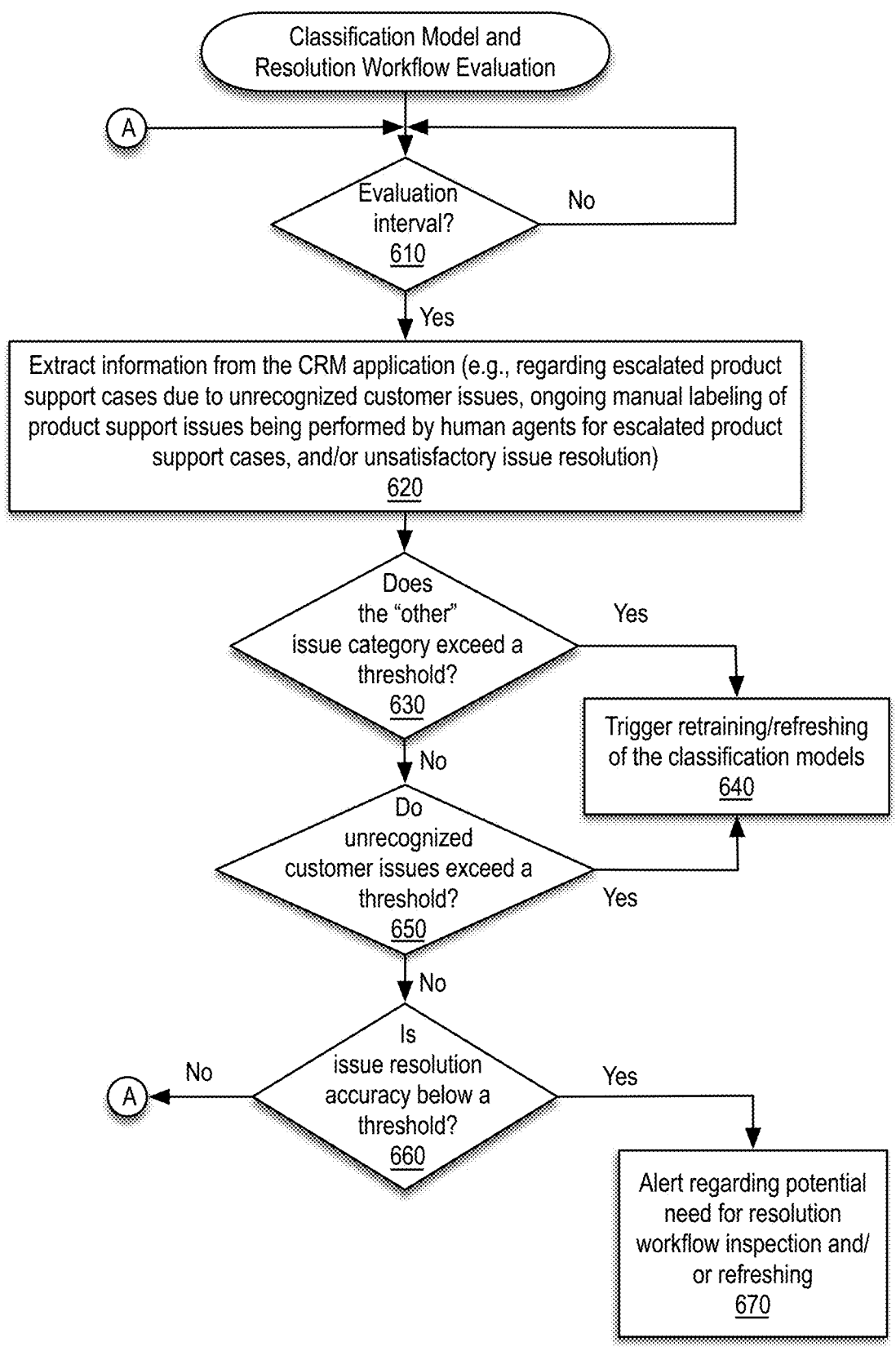
FIG. 6 shows a flow diagram illustrating periodic classification model and resolution workflow evaluation in accordance with an example embodiment.

FIG. 6 shows a flow diagram illustrating periodic classification model and resolution workflow evaluation in accordance with an example embodiment. At decision block 610, it is determined whether an evaluation interval has expired. If so, processing continues with block 620; otherwise, processing loops back to decision block 610.

At block 620, information is extracted from a CRM application (e.g., CRM application 330). For example, statistical information may be obtained regarding the number of escalated product support cases due to unrecognized customer issues by a chatbot (e.g., chatbot 345), ongoing manual labeling of product support issues being performed by human agents (e.g., agents 301), for example, as a result of product support cases escalated from the chatbot (e.g., chatbot 345), and/or unsatisfactory issue resolution by the chatbot.

At decision block 630, it is determined whether the number of product support cases tagged by the agents with an "other" issue category of the product issue categories defined within the CRM application has exceeded a threshold. If so, processing branches to block 640; otherwise, processing continues with decision block 650. A relatively large number of product support cases being associated with the "other" issue category by agents as compared to one or more of the defined product issue categories supported by the chatbot may be indicative of an insufficient number or outdated list of supported product issue categories.

At block 640, a retraining or refreshing of the classification models may be triggered. According to one embodiment, emerging product issue categories may be learned from the escalated cases by artificially boosting (e.g., disproportionately representing) the proportion of escalated cases in the training dataset. For example, escalated cases may be boosted by replicating underrepresented escalated cases by a factor, such as a factor of 2 to 8, to create artificial training data with a more proportionately balanced label count. It is expected that refreshing of the classification models will happen more frequently in the initial stages of a new chatbot deployment and will become less frequent as the underlying models mature.

At decision block 650, it is determined whether a number of escalated cases due to the chatbot being unable to recognize customer issue descriptions exceeds a threshold. If so, processing branches to block 640; otherwise, processing continues with decision block 660. A relatively large number of customer issues being unrecognizable by the chatbot may be indicative of a need for retraining/refreshing the word association models for the product lines at issue. For example, the "other" category being among the top 3 to 7 of the total number of categories may be used as a trigger condition for retraining/refreshing the word association models for the product lines at issue.

At decision block 660, it is determined whether issue resolution accuracy, for example, based on feedback provided by customers via the chatbot is below a threshold. If so, processing continues with block 670; otherwise, processing loops back to decision block 610. A lower than desired issue resolution accuracy may be indicative of the effectiveness or accuracy of the troubleshooting workflow for particular issues/problems diminishing over time, for example, as a result of changes in the product line. In one embodiment, an issue resolution accuracy of approximately between 80% to 90% may be used as a desired issue resolution accuracy threshold.

At block 670, a notification or alert may be generated for an administrative user of the chatbot environment regarding the potential need for resolution workflow inspection and/or refreshing.

While in the context of the present example, each of the evaluations are tied to the same evaluation interval, it is to be understood in alternative embodiments, the various evaluations may have separate evaluation intervals. For example, evaluation of issue resolution accuracy may be performed on a quarterly bases, whereas monitoring of the growth of the "other" issue category may be performed more frequently.

Figure 7:
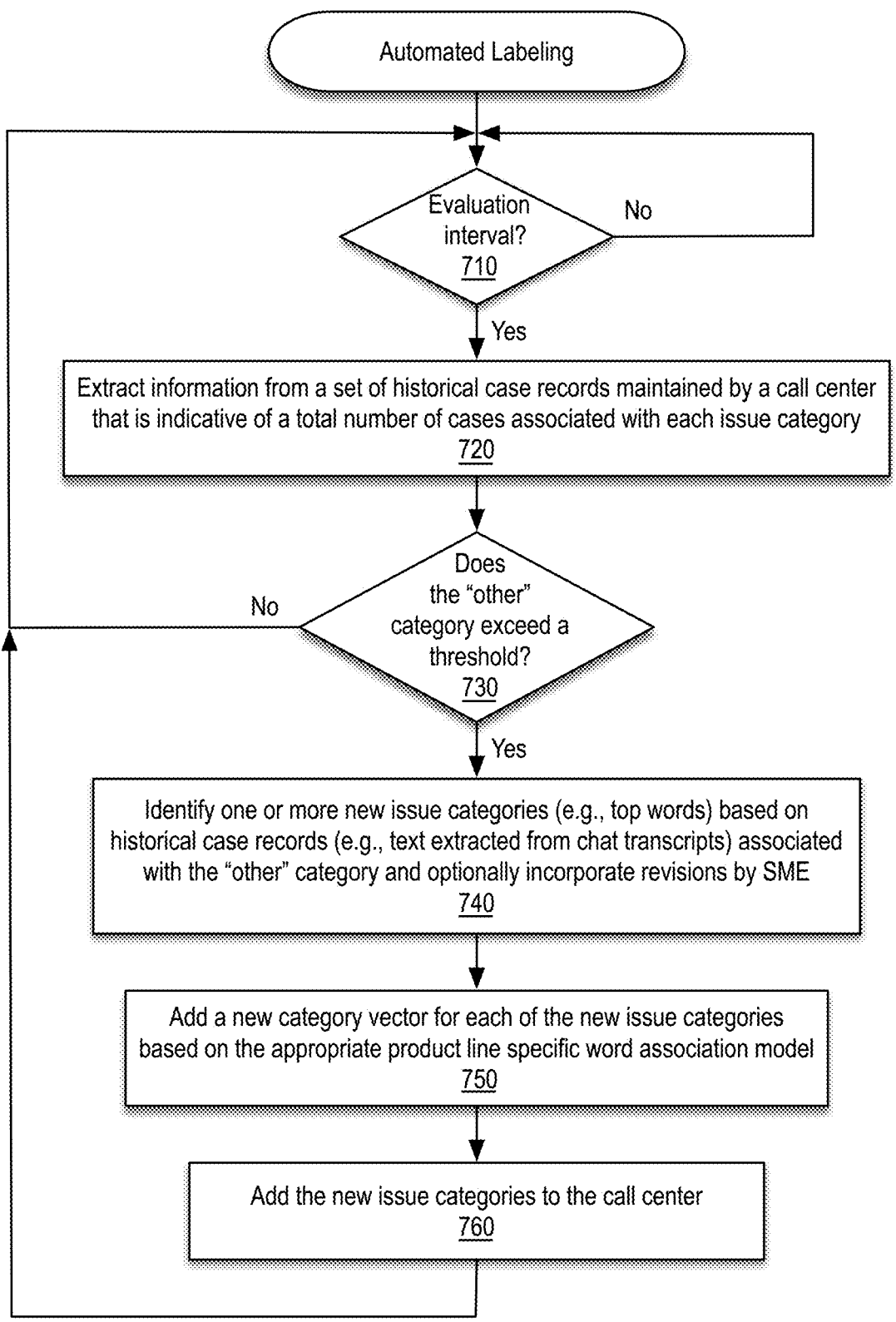
FIG. 7 shows a flow diagram illustrating an unsupervised automated labeling approach for creating new issue categories in accordance with an example embodiment.

FIG. 7 shows a flow diagram illustrating an unsupervised automated labeling approach for creating new issue categories in accordance with an example embodiment. After a first threshold (e.g., 95%) of product support cases has been labeled with SME-validated issue category labels and responsive to the amount of product support cases associated with the "other" category being at or below a second threshold (e.g., 5%), the product support system may transition from a first stage of operations in which a supervised learning process is performed to iteratively train an intermediate classification model (e.g., as described above with reference to FIG. 4) to a second stage of operations in which unsupervised learning may be used to incrementally identify new product issue categories.

In the context of the present example, the automated labeling process is described with reference to a single product line. The process may be repeated as appropriate for each of multiple product lines supported by the product support system.

At decision block 710, a determination is made regarding whether an evaluation interval has expired. If so, processing continues with block 720; otherwise processing loops back to decision block 710. Depending upon the volume of product support cases, the evaluation interval may be expressed in minutes, hours, days, weeks, or months.

At block 720, information indicative of a total number of cases associated with each issue category is extracted from a set of historical case records maintained by a call center. For example, a topic modeling engine (e.g., topic modeling engine 340) may request statistical information for cases records associated with a particular product line via an API (e.g., API 332) of a CRM application (CRM application 330) running within the call center.

At decision block 730, it is determined whether the "other" category exceeds a threshold. In one embodiment, the threshold is expressed as a percentage (e.g., 30%) that is indicative of existing product issue categories (e.g., supported issue categories 341) for the product line at issue having become inadequate to capture the variety of customer described issues. When the "other" category for a particular product line exceeds the threshold, it may be helpful to incrementally add one or more new issue categories to reduce the size of the "other" category and facilitate proper labeling of product support cases by agents (e.g., agents 301) going forward.

At block 740, one or more new issue categories (e.g., top words) are identified based on those of the historical case records associated with the "other" category for the particular product line. According to one embodiment, the topic modeling engine may pull the applicable case records from the CRM application and cause one or more new issue categories (e.g., top words) to be output by a topic model (e.g., LDA) by submitting issue descriptions extracted from the case records to the topic model. The top words for each new issue category may be used as labels for the new issue categories or input and/or validation may be received from an SME.

At block 750, for each of the new categories identified in block 740, a new category vector is added to a list, for example, a product-line specific list of issue category vectors. According to one embodiment, a mapping engine (e.g., mapping engine 350) may maintain a list of issue category vectors per product line and may be responsible for creating new category vectors and updating the appropriate list. As described further below with reference to FIG. 8, an appropriate product-line specific list of issue category vectors may be used during real-time similarity scoring to map customer issue descriptions with one or more matching product issue categories. Advantageously, by incrementally adding new product issue categories and corresponding new issue category vectors, reliance on upon SMEs in connection with labelling may be reduced or entirely done away with and the model retraining performed during the first stage of operations may be avoided.

At block 760, the new issue categories identified in block 740 are added to the call center. For example, the new issue categories or the entire updated list of issue categories for the particular product line at issue may be pushed to the CRM application via API to allow the agents to tag the product support cases they continue to handle with appropriate product issue category labels.

Figure 8:
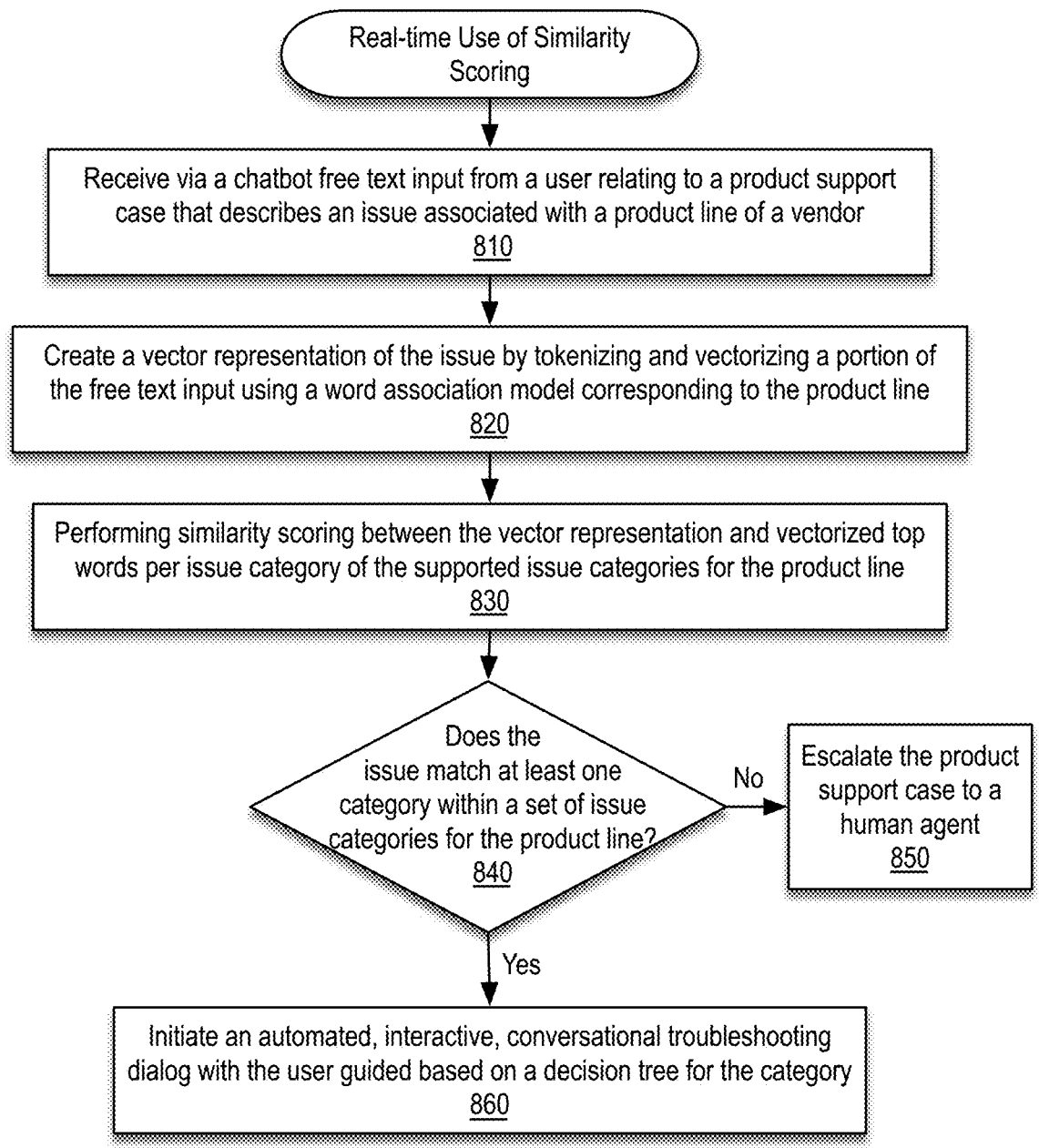
FIG. 8 shows a flow diagram illustrating real-time use of similarity scoring in accordance with an example embodiment.

FIG. 8 shows a flow diagram illustrating real-time use of similarity scoring in accordance with an example embodiment. After a first threshold (e.g., 95%) of product support cases has been labeled with SME-validated issue category labels and responsive to the amount of product support cases associated with the "other" category being at or below a second threshold (e.g., 5%), the product support system may transition from a first stage of operations in which an intermediate classification model (e.g., a product-line specific LSTM model) may be used to map a representation (e.g., a vector representation) of user free text to a matching representation (e.g., a vector representation) of a product issue category (e.g., as described above with reference to FIG. 5) to a second stage of operations in which a the real-time use of similarity scoring may be used in place of the intermediate classification model.

At block 810, free text input relating to a product support case that describes an issue associated with a product line of a vendor is received from a customer (e.g., one of end users 302). In one embodiment, the free text input is received by a chatbot (e.g., chatbot 345) after the chatbot has received information (e.g., a product name and/or serial number) from the customer identifying the product or product line at issue.

At block 820, a vector representation of the customer described issue or problem is created by tokenizing and vectorizing all or some portion of the free text input. In one embodiment, the free text input containing the issue description is input to a product-line specific word association model (e.g., a Word2Vec model).

At block 830, similarity scoring is performed between the vector representation and vectorized top words per issue category of the supported issue categories for the product line. According to one embodiment, a mapping engine (e.g., mapping engine 350) may maintain a list of issue category vectors per product line and may be responsible for performing the similarity scoring between the vector representation of the customer issue description and the product-line specific list of issue category vectors. The similarity scoring may involve the use of cosine similarity to produce a similarity score between the two vectors at issue in the range of 0 to 1, with 0 being the lowest (least similar) and 1 being the highest (the most similar). A variety of other similarity distance measures (e.g., Euclidean distance, Manhattan distance, Minkowski distance, Jaccard similarity, or soft cosine similarity) may be used alternatively to or in combination with cosine similarity.

At decision block 840, it is determined whether the customer issue description matches at least one category within the supported issue categories for the product line. If so, processing continues with block 860; otherwise, processing branches to block 850. Notably, a match may but need not be an exact match. In one embodiment, the two vectors at issue may be considered a match when the degree of similarity between the two vectors meets a predetermined or configurable threshold. For instance, using cosine similarity as an example, two vectors may be considered sufficiently similar to be considered a match when the resulting cosine similarity score is greater than or equal to 0.6.

At block 850, no "matches" were found and the product support case may be escalated to a human agent. As noted above in connection with FIG. 5, such a situation may arise as a result of the customer having described a previously unseen (or unlearned) product issue or the customer issue description not being within the scope of those issues resolvable by the chatbot. Other potential reasons for escalating a product support case may include a finding that the customer is not entitled to support for the product at issue, the chatbot is unable to identify the intent from the customer text after multiple attempts, and/or the customer provides feedback that his/her issue remains unresolved after the chatbot has executed the troubleshooting flows. In one embodiment, before escalating the product support case to the live human agent, the chatbot may further attempt to help the customer to self-solve the issue by performing a search through a support knowledge article database based on the customer defined issue text and may return relevant links to relevant knowledge documents to the customer.

At block 860, at least one (and possibly more than one) "match" was found between the customer issue description and a product issue category; and an automated, interactive, conversational troubleshooting dialog may be initiated with the user as guided based on a decision tree (e.g., one of decision trees 355) for the matching category. In one embodiment, responsive to multiple matches, the customer may be prompted via the chatbot to select the product issue category deemed more closely related to his/her issue. Alternatively, the matches may be prioritized by similarity score and the highest ranking match may be selected for use.

Figure 9:
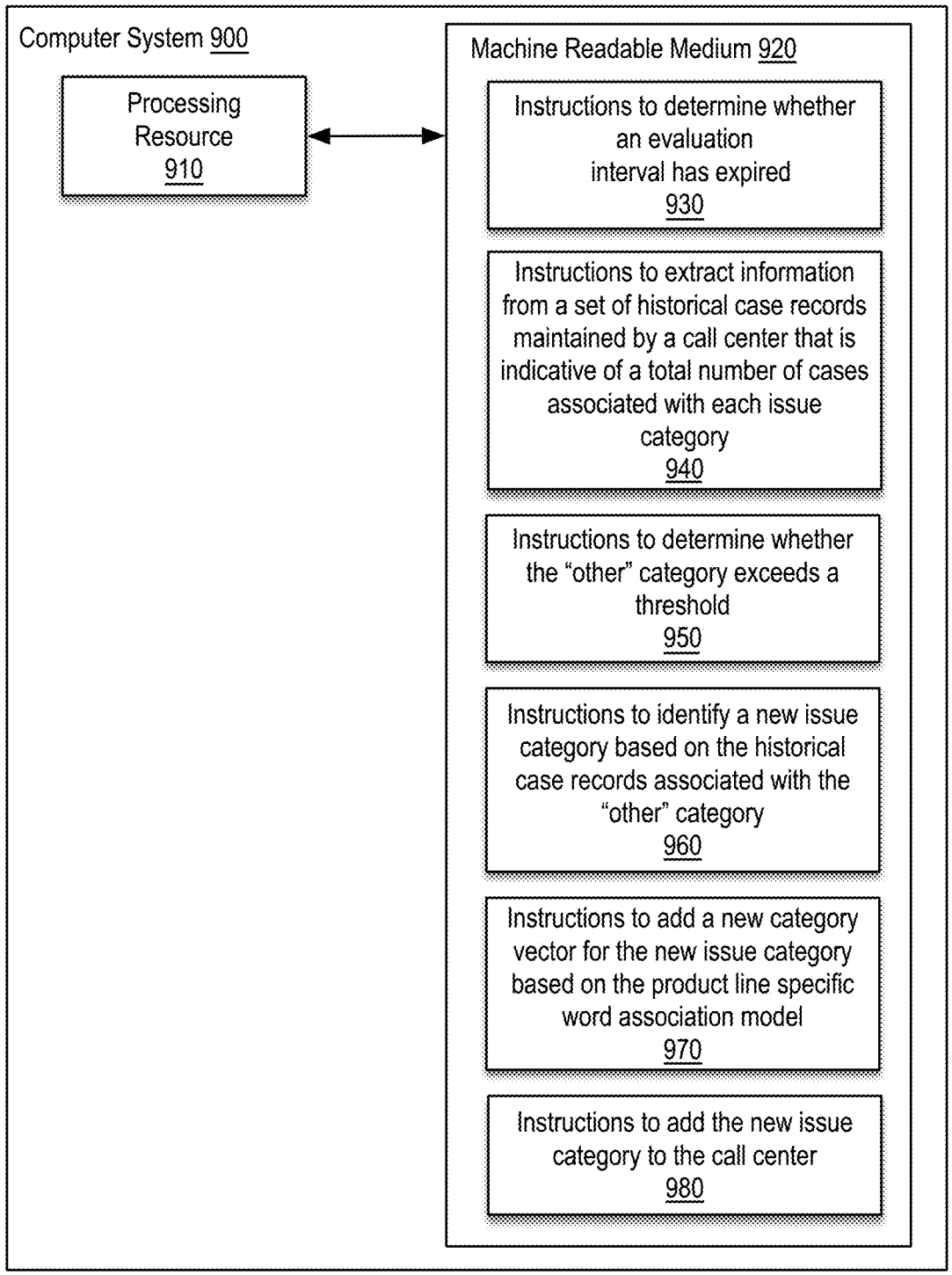
FIG. 9 shows a block diagram of a computer system in accordance with an example embodiment.

FIG. 9 shows a block diagram of a computer system in accordance with an embodiment. In the example illustrated by FIG. 9, computer system 900 includes processing resource 910 coupled to non-transitory, machine readable medium 920 encoded with instructions to perform one or more processes described herein Processing resource 910 may include a microcontroller, a microprocessor, CPU core(s), GPU core(s), an ASIC, an FPGA, and/or other hardware device suitable for retrieval and/or execution of instructions from machine readable medium 920 to perform the functions related to various examples described herein. Additionally or alternatively, processing resource 910 may include electronic circuitry for performing the functionality of the instructions described herein.

Machine readable medium 920 may be any medium suitable for storing executable instructions. Non-limiting examples of machine readable medium 920 include RAM, ROM, EEPROM, flash memory, a hard disk drive, an optical disc, or the like. Machine readable medium 920 may be disposed within computer system 900, as shown in FIG. 9, in which case the executable instructions may be deemed "installed" or "embedded" on computer system 900. Alternatively, machine readable medium 920 may be a portable (e.g., external) storage medium, and may be part of an "installation package." The instructions stored on machine readable medium 920 may be useful for implementing at least part one or more of the methods described herein.

In the context of the present example, machine readable medium 920 is encoded with a set of executable instructions 930-980. It should be understood that part or all of the executable instructions and/or electronic circuits included within one block may, in alternate implementations, be included in a different block shown in the figures or in a different block not shown.

Instructions 930, upon execution, may cause processing resource 910 to determine whether an evaluation interval has expired. In one embodiment, instructions 930 may be useful for performing decision block 710 of FIG. 7.

Instructions 940, upon execution, may cause processing resource 910 to extract information from a CRM application regarding a total number of cases associated with each issue category. In one embodiment, instructions 940 may be useful for performing block 720 of FIG. 7.

Instructions 950, upon execution, may cause processing resource 910 to determine whether the "other" category exceeds a threshold. In one embodiment, instructions 950 may be useful for performing decision block 730 of FIG. 7.

Instructions 960, upon execution, may cause processing resource 910 to identify one or more new issue categories based on historical support case records associated with the "other" category and optionally incorporate revisions to the category labels by an SME. In one embodiment, instructions 950 may be useful for performing block 740 of FIG. 7.

Instructions 970, upon execution, may cause processing resource 910 to add a new vector for each of the new issue categories based on a product line specific word association model. In one embodiment, instructions 970 may be useful for performing block 750 of FIG. 7.

Instructions 980, upon execution, may cause processing resource 910 to add the new issue categories to the CRM application. In one embodiment, instructions 980 may be useful for performing block 760 of FIG. 7.

Figure 10:
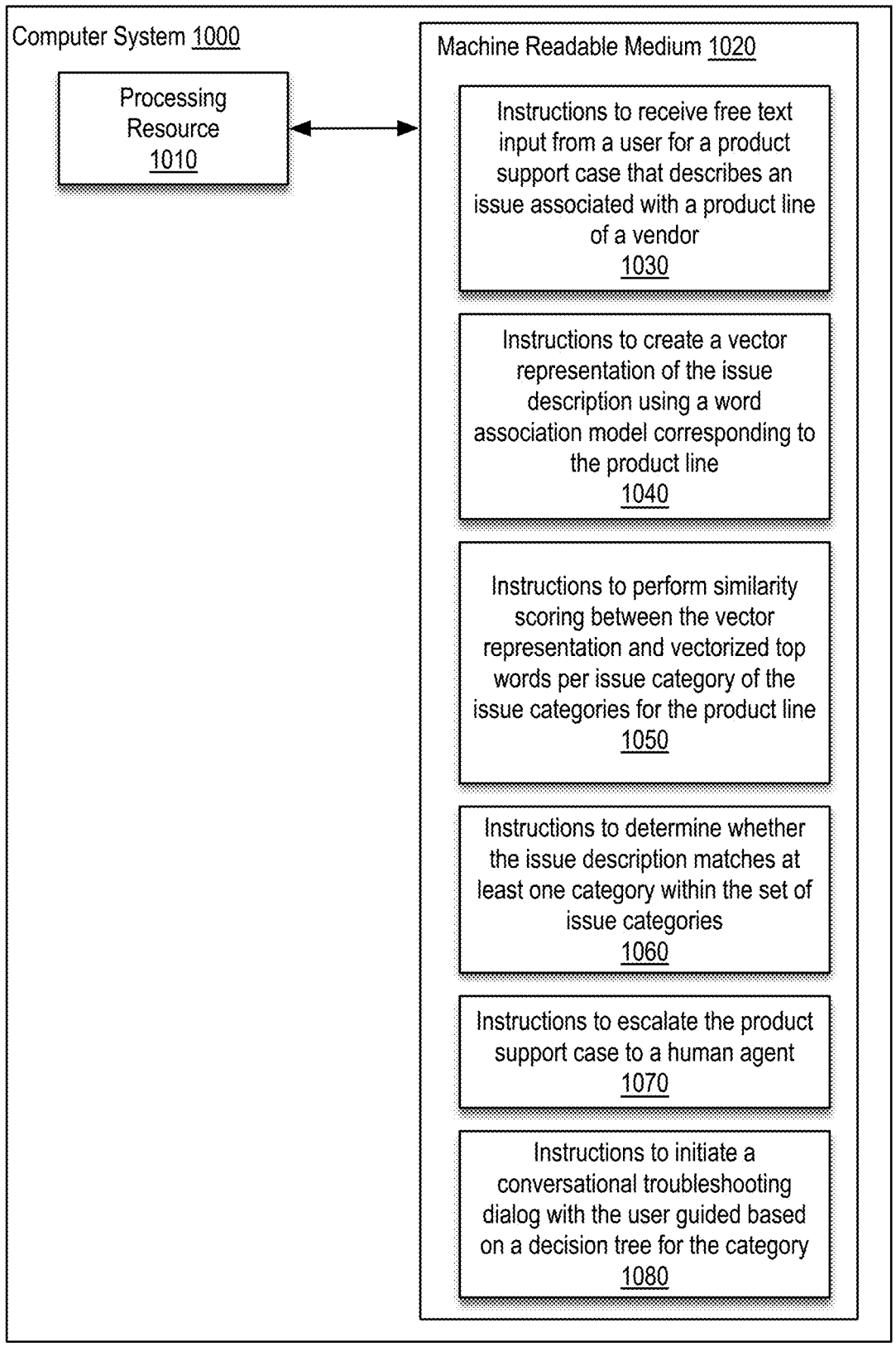
FIG. 10 shows a block diagram of a computer system in accordance with another example embodiment.

FIG. 10 is a block diagram of a computer system in accordance with an alternative embodiment. In the example illustrated by FIG. 10, computer system 1000 includes a processing resource 1010 coupled to a non-transitory, machine readable medium 1020 encoded with instructions to perform one or more processes described herein. As above, the processing resource 1010 may include a microcontroller, a microprocessor, central processing unit core(s), an ASIC, an FPGA, and/or other hardware device suitable for retrieval and/or execution of instructions from the machine readable medium 1020 to perform the functions related to various examples described herein. Additionally or alternatively, the processing resource 1010 may include electronic circuitry for performing the functionality of the instructions described herein.

The machine readable medium 1020 may be any medium suitable for storing executable instructions. Non-limiting examples of machine readable medium 1020 include RAM, ROM, EEPROM, flash memory, a hard disk drive, an optical disc, or the like. The machine readable medium 1020 may be disposed within the computer system 1000, as shown in FIG. 10, in which case the executable instructions may be deemed "installed" or "embedded" on the computer system 1000.

Alternatively, the machine readable medium 1020 may be a portable (e.g., external) storage medium, and may be part of an "installation package." The instructions stored on the machine readable medium 1020 may be useful for implementing at least part of the methods described herein.

In the context of the present example, the machine readable medium 1020 is encoded with a set of executable instructions 1030-1080. It should be understood that part or all of the executable instructions and/or electronic circuits included within one block may, in alternate implementations, be included in a different block shown in the figures or in a different block not shown. For example, in one embodiment, the set of executable instructions 930-980 of FIG. 9 and the set of executable instructions 1030-1080 may be installed on the same computer system.

Instructions 1030, upon execution, may cause the processing resource 1010 to receive free text input from a user for a product support case that describes an issue associated with a product line of a vendor. In one embodiment, instructions 1030 may be useful for performing block 810 of FIG. 8.

Instructions 1040, upon execution, may cause the processing resource 1010 to create a vector representation of the issue using a product line specific word association model. In one embodiment, instructions 1040 may be useful for performing block 820 of FIG. 8.

Instructions 1050, upon execution, may cause the processing resource 1010 to perform a mapping of the issue description to a supported issue category. In one embodiment, instructions 1050 may be useful for performing block 830 of FIG. 8.

Instructions 1060, upon execution, may cause the processing resource 1010 to determine whether the issue matches a supported issue category. In one embodiment, instructions 1060 may be useful for performing decision block 840 of FIG. 8.

Instructions 1070, upon execution, may cause the processing resource 1010 to escalate the product support case to a human agent. In one embodiment, instructions 1070 may be useful for performing block 850 of FIG. 8.

Instructions 1080, upon execution, may cause the processing resource 1010 to initiate an automated, interactive, conversational troubleshooting dialog with the user via a chatbot guided based on a decision tree for the category. In one embodiment, instructions 1080 may be useful for performing block 860 of FIG. 8.

In the foregoing description, numerous details are set forth to provide an understanding of the subject matter disclosed herein. However, implementation may be practiced without some or all of these details. Other implementations may include modifications, combinations, and variations of the details discussed above. It is intended that the following claims cover such modifications, combinations, and variations.

What is claimed is:

1. A system comprising:
    a processing resource; and
    a non-transitory computer-readable medium, coupled to the processing resource, having stored therein instructions that when executed by the processing resource cause the system to:
        receive via a chatbot free text input from a user relating to a product support case, wherein the free text input describes an issue associated with a product line of a vendor;
        create a vector representation of the issue by tokenizing and vectorizing at least a portion of the free text input using a separate word association model corresponding to the product line, wherein the tokenizing comprises generating at least one unigram, bigram, or trigram sequence based on at least the portion of the free text input, and wherein vectorizing comprises converting the at least one unigram, bigram, or trigram sequence into at least one numerical vector;
        determine whether the issue matches at least one issue category of a plurality of issue categories for the product line by using an intermediate classification model to map the vector representation of the free text to a matching vector representation of a plurality of vector representations for the plurality of issue categories;
        responsive to an affirmative determination, initiate an automated, interactive, conversational troubleshooting dialog via the chatbot with the user guided based on a decision tree for the at least one category;
        determine whether a total number of product support cases associated with a catch-call issue category of the plurality of issue categories exceeds a threshold, wherein the catch-all issue category is associated with product support cases that do not fit within another of the plurality of issue categories, wherein the threshold is a percentage of a total number of product support cases associated with a remainder of the plurality of issue categories excluding the catch-call issue category; and
        responsive to the determination that the total number of product support cases associated with the catch-call issue category of the plurality of issue categories exceeds the threshold, add a new issue category to the plurality of issue categories based on the product support cases associated with the catch-all category.

2. The system of claim 1, wherein the issue is considered to match a given category within the plurality of issue categories when a similarity metric generated by a similarity scoring for the vector representation and an issue category vector of the plurality of issue category vectors corresponding to the given category is greater than or equal to a threshold.

3. The system of claim 2, wherein the similarity metric comprises cosine similarity.

4. The system of claim 1, wherein when the issue matches multiple categories within the plurality of issue categories, prompting the user via the chatbot to select a category from the multiple categories.

5. The system of claim 1, wherein the determination of whether the issue matches at least one issue category for the product line is based on a plurality of top words per issue category of the plurality of issue categories, and wherein the plurality of top words have a highest likelihood of being used in conjunction with the respective issue category of the plurality of issue categories.

6. The system of claim 1, wherein the word association model is based on a set of historical support case records maintained by a call center relating to the plurality of issue categories for the product line that are remotely resolvable and meet a predefined threshold of criticality.

7. The system of claim 6, wherein vector output of the word association model is used to generate a topic model to identify clusters of the set of historical support case records according to a taxonomy at a component level of the product line and at a category level within the plurality of issue categories for the product line.

8. The system of claim 7, wherein the topic model comprises Latent Dirichlet Allocation.

9. A non-transitory machine readable medium storing instructions, which when executed by a processing resource of a computer system, cause the computer system to:
- receive via a chatbot free text input from a user relating to a product support case, wherein the free text input describes an issue associated with a product line of a vendor;
- create a vector representation of the issue by tokenizing and vectorizing at least a portion of the free text input using a separate word association model corresponding to the product line, wherein the tokenizing comprises generating at least one unigram, bigram, or trigram sequence based on at least the portion of the free text input, and wherein vectorizing comprises converting the at least one unigram, bigram, or trigram sequence into at least one numerical vector;
- determine whether the issue matches at least one issue category of a plurality of issue categories for the product line by using an intermediate classification model to map the vector representation of the free text to a matching vector representation of a plurality of vector representations for the plurality of issue categories;
- responsive to an affirmative determination, initiate an automated, interactive, conversational troubleshooting dialog via the chatbot with the user guided based on a decision tree for the at least one category;
- determine whether a total number of product support cases associated with a catch-call issue category of the plurality of issue categories exceeds a threshold, wherein the catch-all issue category is associated with product support cases that do not fit within another of the plurality of issue categories, wherein the threshold is a percentage of a total number of product support cases associated with a remainder of the plurality of issue categories excluding the catch-call issue category; and
- responsive to said determining being affirmative, add a new issue category to the plurality of issue categories based on the product support cases associated with the catch-all category.

10. The non-transitory machine readable medium of claim 9, wherein the instructions further cause the computer system to, responsive to a negative determination, escalate the product support case to a human agent.

11. The non-transitory machine readable medium of claim 9, wherein a similarity metric utilized by a similarity scoring comprises cosine similarity.

12. The non-transitory machine readable medium of claim 9, wherein when the issue matches multiple categories within the plurality of issue categories, prompting the user via the chatbot to select a category from the multiple categories.

13. The non-transitory machine readable medium of claim 9, wherein the word association model is based on a set of historical support case records maintained by a call center relating to the plurality of issue categories for the product line that are remotely resolvable and meet a predefined threshold of criticality.

14. The non-transitory machine readable medium of claim 13, wherein the word association model is generated by applying a topic model to identify clusters of the set of historical support case records according to a taxonomy at a component level of the product line and at a category level within the plurality of issue categories for the product line.

15. The non-transitory machine readable medium of claim 14, wherein the determination of whether the issue matches at least one issue category for the product line is based on a plurality of top words per issue category of the plurality of issue categories, and wherein the plurality of top words identified by the topic model as have a highest likelihood of being used in conjunction with the respective issue category of the plurality of issue categories.

16. The non-transitory machine readable medium of claim 14, wherein the topic model comprises Latent Dirichlet Allocation.

17. The system of claim 1, wherein the word association model comprises a product-line specific word association model configured to create the plurality of vector representations for each issue category of the plurality of issue categories per product line.

18. The system of claim 1, wherein mapping the vector representation of the free text to a matching vector representation comprises using a similarity scoring between the free text and one or more matching product issue categories.

19. The system of claim 1, further comprising instructions causing the system to:
- extract, from a set of historical support case records, the total number of product support cases associated with each of the plurality of issue categories for the product line of a vendor; and
- responsive to the determination that the total number of product support cases associated with the catch-call issue category of the plurality of issue categories exceeds the threshold:
  - identify the new issue category based on the product support cases associated with the catch-call category;
  - add a new category vector for the new issue category to a set of category vectors corresponding to the plurality of issue categories by vectorizing a plurality of top words of the new issue category based on vector output of a word association model corresponding to the product line; and
  - facilitate association of subsequent product support cases with the new issue category by agents utilizing a call center by adding the new issue category to the plurality of issue categories.

* * * * *